US012673682B2

(12) United States Patent (10) Patent No.: US 12,673,682 B2
Zhu et al. (45) Date of Patent: Jul. 7, 2026

(54) ENERGY RECOVERY METHOD AND DEVICE, ELECTRIC VEHICLE, AND STORAGE MEDIUM

(71) Applicant: BYD COMPANY LIMITED, Shenzhen (CN)

(72) Inventors: Futang Zhu, Shenzhen (CN); Yawei Liu, Shenzhen (CN); Chunsheng Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 236 days.

(21) Appl. No.: 18/315,612

(22) Filed: May 11, 2023

(65) Prior Publication Data

US 2023/0278561 A1 Sep. 7, 2023

Related U.S. Application Data

(63) Continuation of application No. PCT/CN2021/128513, filed on Nov. 3, 2021.

(30) Foreign Application Priority Data

Nov. 13, 2020 (CN) .......................... 202011272026.3

(51) Int. Cl.
*B60W 30/18* (2012.01)
*B60W 40/06* (2012.01)
(52) U.S. Cl.
CPC ...... *B60W 30/18127* (2013.01); *B60W 40/06* (2013.01); *B60W 2510/083* (2013.01); *B60W 2710/18* (2013.01); *B60W 2710/242* (2013.01)

(58) Field of Classification Search
None
See application file for complete search history.

(56) References Cited

U.S. PATENT DOCUMENTS

2016/0023563 A1* 1/2016 Wang ..................... B60L 58/24
320/152
2016/0221469 A1 8/2016 Cheng et al.
2018/0334038 A1* 11/2018 Zhao ..................... B60W 30/16
2019/0270384 A1 9/2019 Liu et al.

FOREIGN PATENT DOCUMENTS

CN 106394258 A 2/2017
CN 108928238 A 12/2018
CN 109572439 A 4/2019
CN 109941290 A 6/2019
KR 20090118712 A 11/2009

OTHER PUBLICATIONS

The World Intellectual Property Organization (WIPO) International Search Report for PCT/CN2021/128513 Jan. 25, 2022 5 Pages.

* cited by examiner

*Primary Examiner* — Madison R. Inserra
(74) *Attorney, Agent, or Firm* — Wenye Tan

(57) ABSTRACT

An energy recovery method and device, an electric vehicle, and a storage medium are provided. The energy recovery method includes: acquiring vehicle travelling information, wherein the vehicle travelling information comprises road condition information and travelling status information; acquiring a vehicle braking demand according to the road condition information and the travelling status information; predicting a first motor braking feedback according to the vehicle braking demand; and performing energy recovery according to the first motor braking feedback.

14 Claims, 2 Drawing Sheets

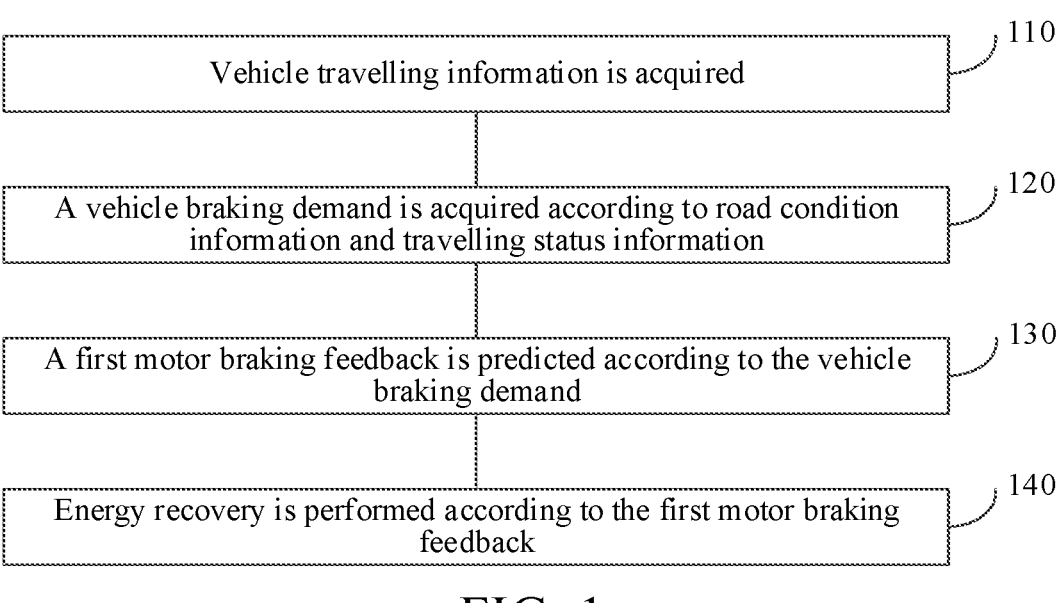

Vehicle travelling information is acquired — 110

A vehicle braking demand is acquired according to road condition information and travelling status information — 120

A first motor braking feedback is predicted according to the vehicle braking demand — 130

Energy recovery is performed according to the first motor braking feedback — 140

FIG. 1

A wheel end feedback torque during vehicle braking is calculated according to the vehicle braking demand — 210

A first motor feedback torque of the first motor braking feedback is acquired according to the wheel end feedback torque during vehicle braking — 220

A first motor feedback time of the first motor braking feedback is acquired according to the first motor feedback torque — 230

An optimal pulse charging power is acquired according to the battery pulse charging characteristic and the first motor braking feedback — 240

A second motor braking feedback is acquired according to the optimal pulse charging power, the vehicle braking demand, and a motor-acceptable torque limit — 250

FIG. 2

ENERGY RECOVERY METHOD AND DEVICE, ELECTRIC VEHICLE, AND STORAGE MEDIUM

CROSS-REFERENCE TO RELATED APPLICATIONS

The present application is a continuation application of PCT application No. PCT/CN2021/128513 filed on Nov. 3, 2021, which is based on and claims priority to Chinese Patent Application No. 202011272026.3, entitled "ENERGY RECOVERY METHOD AND DEVICE, ELEC-TRIC VEHICLE, AND STORAGE MEDIUM" and filed on Nov. 13, 2020. The entire content of all of the above-referenced applications is incorporated herein by reference.

FIELD

The present disclosure generally relates to the technical field of automobiles, and more specifically, to the field of energy recovery for electric vehicles, and in particular, to an energy recovery method and device, an electric vehicle, and a storage medium.

BACKGROUND

Energy recovery is a significant means for energy conservation and consumption reduction of electric vehicles. Currently, energy recovery is mainly realized in two ways. The first one is braking feedback, which is a process in which a motor performs braking when a driver depresses a brake pedal. The other is throttle-release feedback, which means that the motor performs constant deceleration braking through a preset feedback strength when the driver releases the throttle for coasting. A motor feedback torque is a sum of a braking feedback torque and a throttle release feedback torque. A larger motor feedback torque leads to more recovered energy.

During actual application, the inability to accurately determine an optimal motor feedback torque affects the energy recovery effect.

Therefore, according to the present disclosure, an energy recovery method with an improved energy recovery effect is desired.

SUMMARY

In view of the above defects or disadvantages in the related art, an energy recovery method and device, an electric vehicle, and a storage medium are desired.

Based on an aspect of embodiments of the present disclosure, an energy recovery method is provided. The method includes: acquiring vehicle travelling information, where the vehicle travelling information includes road condition information and travelling status information; acquiring a vehicle braking demand according to the road condition information and the travelling status information; predicting a first motor braking feedback according to the vehicle braking demand; and performing energy recovery according to the first motor braking feedback.

The present disclosure further discloses a non-transitory computer-readable storage medium. The non-transitory computer-readable storage medium stores computer-executable instructions for, when executed by one or more processors, performing an energy recovery method. The method includes acquiring vehicle travelling information, wherein the vehicle travelling information comprises road condition information and travelling status information; acquiring a vehicle braking demand according to the road condition information and the travelling status information; predicting a first motor braking feedback according to the vehicle braking demand; and performing energy recovery according to the first motor braking feedback.

In the embodiments of the present disclosure, the motor braking feedback is predicted according to the vehicle travelling information, and energy recovery is performed according to the motor braking feedback.

BRIEF DESCRIPTION OF THE DRAWINGS

Other features, objectives, and advantages of the present disclosure become more apparent by detailed description of the following non-limiting embodiments made with reference to the drawings.

FIG. 1 is an exemplary flowchart of an energy recovery method according to an embodiment of the present disclosure.

FIG. 2 is another exemplary flowchart of an energy recovery method according to another embodiment of the present disclosure.

DETAILED DESCRIPTION

Figure 3:
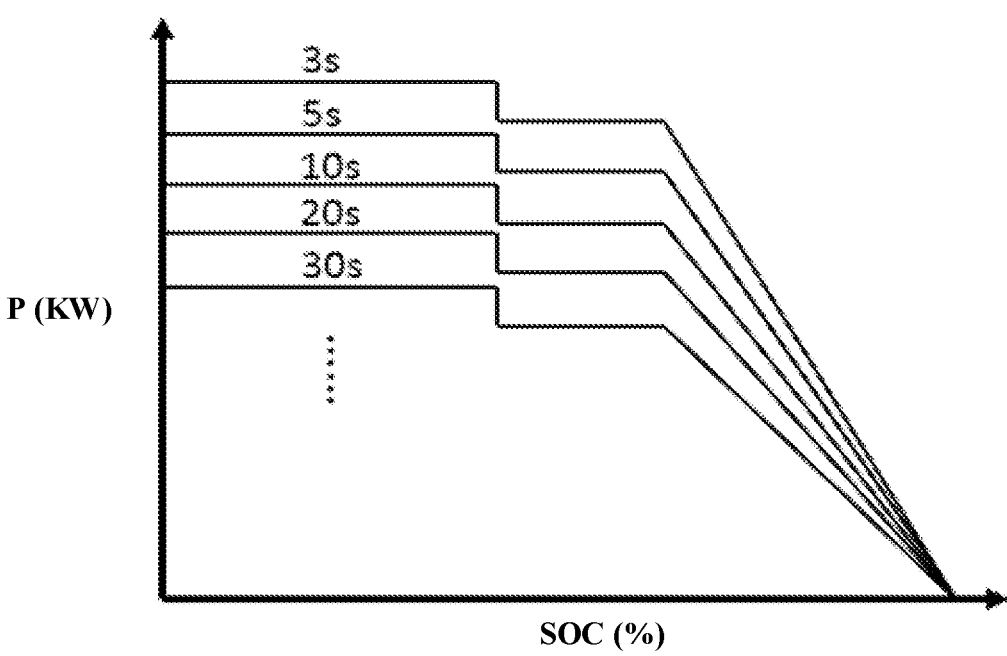
FIG. 3 is a structural diagram of an energy recovery device according to another embodiment of the present disclosure.

The present disclosure is described in further details below with reference to the drawings. It may be understood that the specific embodiments described herein are used for explaining but not limiting the present invention. It should be noted that the embodiments in the present disclosure and features in the embodiments may be combined with each other in case of no conflict.

FIG. 1 shows an exemplary process of an energy recovery method according to an embodiment of the present disclosure.

As shown in FIG. 1, in step 110, vehicle travelling information is acquired, where the vehicle travelling information includes road condition information and travelling status information.

Specifically, during actual travelling of a vehicle, a travelling status of the vehicle needs to be learned in real time, and whether vehicle braking is required is determined according to the travelling status of the vehicle. The vehicle travelling information may be acquired through an instrument on the vehicle, or may be acquired through external devices. For example, vehicle location information is acquired through a positioning system, condition information of a current or next-stage road is acquired through a high-definition map, such as uphill, downhill, road narrowing, road widening, and sharp turns, information about vehicles and congestion ahead is acquired through a camera to determine whether there are pedestrians, traffic lights, and the like, a vehicle speed, a vehicular gap, a relative speed of vehicles, and the like are acquired through radar, and corresponding vehicle travelling information is acquired through various sensors. The acquired road condition information and vehicle travelling status information during vehicle travelling provide a basis for determining whether to perform vehicle braking.

In step 120, a vehicle braking demand is acquired according to the road condition information and the travelling status information.

Specifically, the vehicle braking demand includes a vehicle braking speed and a vehicle braking time. The vehicle braking speed is a travelling speed required for complete braking within a set safety distance. The vehicle braking time is a travelling time required for completing braking within the safety distance at the vehicle braking speed. After the vehicle travelling information is acquired, it is determined whether vehicle braking needs to be performed according to a real-time travelling status. Specifically, a threshold for enable of vehicle braking may be set. For example, when the camera detects a pedestrian within a set distance in front, the camera sends a message to prompt a driver to perform vehicle braking. The prompt message may be in the form of a sound or an image. For example, the camera may prompt the driver to release an accelerator through text. For example, when the high-definition map detects a sudden turn in the road ahead, the high-definition map needs to prompt the driver to perform vehicle braking. Through the acquired vehicle travelling information, vehicle braking may be determined in advance, thereby optimizing energy recovery.

During vehicle braking, a vehicle braking deceleration and a deceleration time may be calculated according to information such as a vehicle travelling speed and a braking distance based on the common laws of physics.

Specifically, the acquisition of the vehicle braking demand according to the road condition information and the travelling status information includes the following:

A vehicle braking distance is acquired according to the road condition information and the travelling status information. Specifically, the vehicle braking distance may be obtained by a ranging instrument such as a radar instrument, an infrared instrument, a laser instrument, or an acoustic instrument by measuring a distance to an obstacle in front, or may be measured by a high-definition map in collaboration with a positioning system. The positioning system herein may be the "Beidou" positioning system, the "global positioning system (GPS)", the "Galileo" positioning system, or the "Granas" positioning system.

A vehicle braking deceleration and a time corresponding to the deceleration according to the vehicle braking distance are acquired. Specifically, since the braking distance and the vehicle traveling speed are known, the deceleration and deceleration time required for completing braking may be calculated based on the ordinary physical principles.

The vehicle braking demand is calculated according to the vehicle braking deceleration and the time corresponding to the deceleration. Specifically, the vehicle braking demand is a torque required for a vehicle wheel end to complete the braking task. The wheel end torque is a power applied to the vehicle wheel end during braking. This is because the vehicle braking deceleration depends on the power at the vehicle wheel end.

Step 130: A first motor braking feedback is predicted according to the vehicle braking demand.

The first motor braking feedback is a torque fed back from the vehicle wheel end to a motor when the vehicle braking is completed in a current situation without regard to any external factor. It should be emphasized that a first motor feedback time and a first motor feedback torque determined by the first motor braking feedback do not consider whether the motor can withstand a vehicle braking feedback torque, and only represent a torque fed back from the vehicle wheel end to the motor and a duration of the feedback during braking.

The first motor feedback time and the first motor feedback torque during braking of the electric vehicle are calculated from the vehicle braking deceleration and the time corresponding to the deceleration. The first motor feedback torque is the torque fed back from the wheel end to the motor during vehicle braking, which is generally a percentage of the torque fed back from the wheel end. For example, during vehicle braking, 40% of the energy is used for controlling vehicle braking and generating heat, and 60% of the energy is recyclable. In the 60% of the energy, 10% is consumed for torque feedback, and the remaining 50% is the first motor feedback torque received by the motor. After the first motor feedback torque is acquired, the first motor feedback time may be determined through a battery pulse charging characteristic, which is the duration of the first motor feedback torque received by the motor.

The battery pulse charging characteristic is shown in FIG. 3. An abscissa SOC (%) in the figure represents a remaining state of charge of a battery, that is, an amount of charge remaining in the battery. If the remaining charge is 0, it indicates that the charge of the battery is 0. If the remaining charge is 100, it indicates the battery is fully charged. An ordinate P (KW) represents a battery pulse charging power. The battery pulse charging power decreases as the duration increases, and decreases as the remaining charge of the battery increases.

Specifically, as shown in FIG. 2, the prediction of the first motor braking feedback according to the vehicle braking demand includes the following:

In step 210, a wheel end feedback torque during vehicle braking is calculated according to the vehicle braking demand.

Specifically, the vehicle braking demand includes the vehicle braking speed and the vehicle braking time. Therefore, the torque required for the vehicle wheel end to complete the vehicle braking may be obtained from the vehicle braking speed and the vehicle braking time, that is, the wheel end feedback torque during the vehicle braking. It should be emphasized that the wheel end feedback torque during the vehicle braking is not controlled by a torque outputted by the motor or an engine, but is a power generated through braking of the vehicle wheel end. The outputted power is generated when a braking system acts on the wheel end. The wheel end torque is multiplied by a coefficient and fed back to the motor for energy recovery by the motor, and the motor receives the first motor feedback torque. It should be noted that a specific value of the coefficient multiplied by the wheel end torque is related to the performance of the vehicle, and different vehicles have different coefficients.

In step 220, a first motor feedback torque of the first motor braking feedback is acquired according to the wheel end feedback torque during vehicle braking.

In step 230, a first motor feedback time of the first motor braking feedback is acquired according to the first motor feedback torque, where the first motor feedback time is determined by the first motor feedback torque according to a battery pulse charging characteristic.

Due to the impact of the output power of the motor and a duration of the power during charging of the battery pulse by the motor, the motor may charge the battery immediately after acquiring the motor feedback torque. In this way, based on the battery pulse charging characteristic, a time of charging of the battery by the motor, that is, the first motor feedback time, may be acquired according to the remaining charge of the battery at the current battery pulse charging power.

The prediction of the first motor braking feedback according to the vehicle braking demand further includes the following:

In step 240, an optimal pulse charging power is acquired according to the battery pulse charging characteristic and the first motor braking feedback.

It should be noted that during specific implementation, due to the impact of the motor performance, the actual torque fed back from the wheel end during vehicle braking, the remaining charge of the battery, and the like, the first vehicle braking feedback is not accepted by the motor. An accurate vehicle braking feedback suitable for reception by the motor and conforming to the battery pulse charging characteristic during battery charging needs to be acquired based on the first vehicle braking feedback, to achieve the maximum energy recovery efficiency. Since pulse charging is more efficient than constant current charging, pulse charging is usually used for charging of vehicle batteries. Since battery pulse charging is subjected to the impact of the battery pulse charging characteristic, a proper pulse charging power needs to be selected for the battery, that is, an optimal pulse charging power needs to be selected. That is to say, an optimal vehicle braking feedback is determined.

Specifically, the optimal charging pulse power is related to both the vehicle braking feedback and the battery pulse charging characteristic. Since the present disclosure is intended to maximize energy recovery for vehicle braking, the battery needs to be prevented from starting constant current charging too early, and it is best to maintain the battery in a pulse charging state. Different pulse powers are used at different stages based on the battery pulse charging characteristic.

In step 250, a second motor braking feedback is acquired according to the optimal pulse charging power, the vehicle braking demand, and a motor-acceptable torque limit.

Specifically, acquiring the optimal pulse charging power does not necessarily mean that the wheel end torque during vehicle braking satisfies the optimal pulse charging power. Instead, a torque that the wheel end may feed back during vehicle braking needs to be determined. The actual feedback torque is the second motor feedback torque, which is an actual feedback torque that may be outputted by the wheel end to the motor for energy recovery and battery charging. The second motor feedback torque is subjected to the impact of the optimal pulse charging power, the vehicle braking demand, and the motor-acceptable torque limit. The optimal pulse charging power determines whether the pulse power received by the motor is optimal and whether the motor charging efficiency is the highest, and the vehicle braking demand determines whether the vehicle can complete braking as required. The motor-acceptable torque limit is an allowed maximum feedback torque that may be received by the motor. If the torque exceeds the torque limit, the motor may be damaged. Therefore, the three factors need to be used to obtain the optimal motor braking feedback, that is, obtain the second motor braking feedback.

Specifically, the acquisition of the optimal pulse charging power according to the battery pulse charging characteristic and the first motor braking feedback includes the following:

The first motor feedback time and the first motor feedback torque of the first motor braking feedback are acquired.

A maximum battery pulse charging power is acquired according to the first motor feedback time and the first motor feedback torque. Specifically, the maximum battery pulse charging power herein is a maximum battery pulse charging power fed back to the motor during vehicle braking.

A charging duration of the maximum battery pulse charging power is acquired according to a battery pulse charging characteristic corresponding to the maximum battery pulse charging power. Specifically, the charging duration of the maximum battery pulse charging power may be found through the battery pulse charging characteristic.

The optimal pulse charging power is determined according to the charging duration of the maximum battery pulse charging power, the battery pulse charging characteristic, and the first motor feedback time. The battery pulse charging characteristic is shown in FIG. 3. Determining the optimal pulse charging power is subjected to the combined impact the charging duration of the maximum battery pulse charging power, the battery pulse charging characteristic, and the first motor feedback time. Through the three factors, the optimal pulse charging power can be obtained.

In a specific embodiment, the acquisition of the second motor braking feedback according to the optimal pulse charging power, the vehicle braking demand, and a motor-acceptable torque limit includes:

determining a motor-allowed wheel end feedback torque according to the optimal pulse charging power, where the motor-allowed wheel end feedback torque is a torque allowed to be fed back from a vehicle wheel end to a motor in an optimal pulse charging power condition;

determining a wheel end demand torque for vehicle braking according to the vehicle braking demand, where the wheel end demand torque is a torque required for completing braking of the wheel end during braking of the vehicle;

determining a motor-acceptable maximum wheel end feedback torque according to the motor-acceptable torque limit, where the motor-acceptable maximum wheel end feedback torque is a motor-acceptable maximum torque fed back by the wheel end to the motor; and selecting the smallest one of absolute values of the motor-allowed wheel end feedback torque, the wheel end demand torque for vehicle braking, and the motor-acceptable maximum wheel end feedback torque as a second motor feedback torque.

Specifically, since the second motor feedback torque is the torque actually applied to the motor for charging the battery, in order to ensure the safety of the motor, ensure the highest battery charging efficiency, and satisfy the actual torque the wheel end may feed back during vehicle braking, the smallest one of three torques needs to be selected. The second motor feedback torque acquired herein is the feedback torque that is actually received by the motor and that may be transmitted to the motor from the vehicle wheel end during vehicle braking. That is to say, the motor can only receive the energy of the amount, and the excess energy needs to be consumed. The motor converts the energy of the second motor feedback torque into a pulse current to charge the battery according to the battery pulse charging characteristic.

In step 140, energy recovery is performed according to the first motor braking feedback.

Specifically, since the second vehicle braking feedback is obtained by using the first vehicle braking feedback through a corresponding calculation, the first vehicle braking feedback here includes the second vehicle braking feedback. Therefore, energy recovery is performed through the first vehicle braking feedback.

In an embodiment, the energy recovery method further includes:

providing a braking torque parameter to a braking controller according to the vehicle braking demand, to control the second motor feedback torque for vehicle braking; and enabling mechanical braking if the braking torque parameter of the second motor feedback torque does not satisfy the vehicle braking demand.

Specifically, in this embodiment of the present disclosure, motor braking is preferred. If the vehicle wheel end torque can be fully fed back and received by the motor, motor braking is achieved. If the vehicle wheel end torque cannot be fully received, mechanical braking is required to assist in receiving the excess vehicle wheel end feedback.

In the embodiments of the present disclosure, the motor braking feedback is predicted according to the vehicle travelling information, and energy recovery is performed according to the motor braking feedback. In the present disclosure, during the energy recovery, prediction may be performed based on the vehicle travelling information, and an optimal battery charging power and a duration of each power segment are planned in advance, to realize maximum energy cycle. Through the predictive energy recovery and driving assistance, a probability that a driver depresses a brake deeply is reduced, thereby reducing the energy loss caused by mechanical braking, and improving the utilization of energy recovery.

Figure 4:
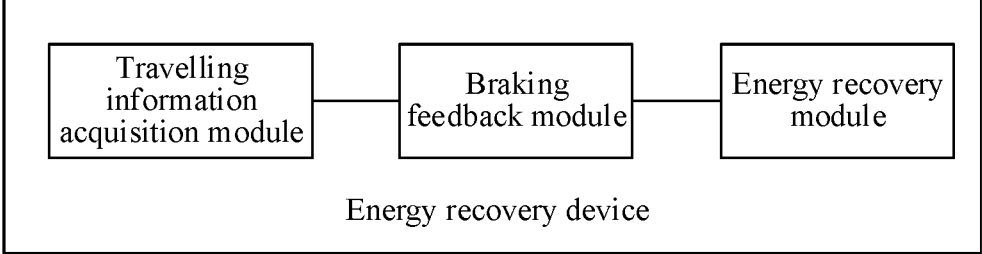
FIG. 4 is a schematic diagram of a battery pulse charging characteristic according to another embodiment of the present disclosure.

FIG. 4 is a structural diagram of an energy recovery device according to an embodiment of the present disclosure. As shown in FIG. 4, the energy recovery device provided in this embodiment includes a travelling information acquisition module, a braking feedback module, and an energy recovery module.

The travelling information acquisition module is configured to acquire vehicle travelling information, where the vehicle travelling information includes road condition information and travelling status information during vehicle travelling.

Specifically, during vehicle travelling, due to a road condition, a traffic condition, a congestion condition, a vehicle travelling speed, a vehicular gap, and the like, it is necessary to brake the vehicle in real time. For example, during vehicle travelling, if there is a downhill at a certain meter in front, a red light is detected, a pedestrian is seen, a vehicular gap is too small, or a vehicle speed is too high, it is necessary to brake the vehicle. Vehicle travelling information may be acquired through an on-board positioning system such as the "Beidou" system, the "GPS", the "Granas" system, or the "Galileo" system, or may be acquired through a camera, a laser sensor, a radar sensor, an infrared sensor, a distance sensor, a speed sensor, or the like. Position information of the vehicle, distance information between the vehicle and an obstacle in front, the speed information of the vehicle, the vehicular gap, and relative speed information, a vehicle congestion condition, road ramp information, road traffic light information, and the like are acquired through the devices.

The braking feedback module is configured to acquire a vehicle braking demand and predict a first motor braking feedback according to the acquired road condition information and travelling status information during vehicle travelling.

Specifically, whether vehicle braking is required is determined according to the vehicle travelling information. If braking is required, a distance to the obstacle, a vehicle deceleration required for ensuring braking safety, and a deceleration time in a current vehicle speed condition are calculated. By calculating the vehicle deceleration, the motor feedback torque and the motor feedback time may be acquired. The motor feedback torque is the power received by the motor during vehicle braking, and the motor feedback time is the time for which the motor receives the power fed back during vehicle braking.

The energy recovery module is configured to performing energy recovery according to the predicted first motor braking feedback.

During vehicle deceleration or braking, an energy recovery device connected to the driving wheel converts a part of the kinetic energy of the vehicle to energy of other forms for storage, to achieving recovery of braking energy during deceleration or braking. Then, when the vehicle starts or accelerates, the stored energy is released to increase a driving force on the driving wheel or increase an endurance mileage of the electric vehicle.

During energy recovery, a pulse current is the largest when the vehicle starts braking, and therefore a recoverable power is the largest. When the vehicle almost stops, the recovered energy is zero. The energy recovery efficiency is closely related to the battery pulse charging power. A higher battery pulse charging power leads to a shorter pulse charging duration but higher battery charging efficiency, while a lower battery pulse charging power leads to a longer continuous charging time, which is similar to constant current charging. Since the vehicle braking time is limited, a higher battery pulse charging power leads to higher battery charging efficiency within the same time period. However, if the battery pulse charging power is too high, the state of charge of the battery quickly reaches a certain percentage, and therefore the battery cannot be charged when the vehicle braking speed decreases to a certain degree in the later stage. Thus, the battery pulse charging power needs to be selected in comprehensive consideration.

In this embodiment of the present disclosure, the vehicle travelling information is acquired through the travelling information acquisition module, the motor braking feedback is predicted through the braking feedback module, and the energy recovery is performed through the energy recovery module according to the motor braking feedback. In the present disclosure, during the energy recovery, prediction may be performed based on the vehicle travelling information, and an optimal battery charging power and a duration of each power segment are planned in advance, to realize maximum energy cycle. Through the predictive energy recovery and driving assistance, a probability that a driver depresses a brake deeply is reduced, thereby reducing the energy loss caused by mechanical braking, and improving the utilization of energy recovery.

Figure 5:
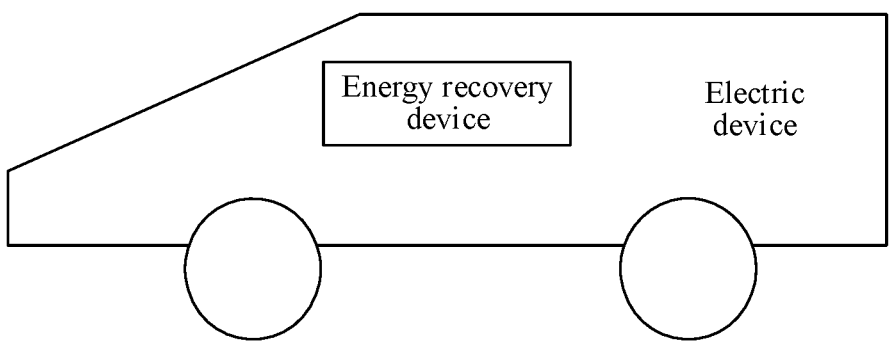
FIG. 5 is a structural diagram of an electric vehicle according to an embodiment of the present disclosure.

As shown in FIG. 5, the present disclosure further discloses an electric vehicle. The electric vehicle includes the energy recovery device in the embodiments of the present disclosure.

Particularly, according to an embodiment of the present disclosure, the energy recovery method described in any of the above embodiments may be implemented as a computer software program. For example, an embodiment of the present disclosure includes a computer program product that includes a computer program tangibly included in a machine-readable medium. The computer program includes program code for executing the energy recovery method. In such an embodiment, the computer program may be downloaded and installed from a network through a communication portion and/or installed from a removable medium.

The one or more programs are stored in a read-only memory (ROM) or a random access memory (RAM) to perform various appropriate actions and processes. The RAM software programs for a server to complete corresponding services, as well as various programs and data required for vehicle driving operations. The server and hardware devices controlled by the server, the ROM, and the RAM are connected with each other through a bus, and various input/output interfaces are connected with the bus.

The following components are connected with the input/ output interfaces: an input portion including a keyboard, a mouse, and the like; an output portion including a cathode ray tube (CRT), a liquid crystal display (LCD), a speaker, and the like; and a communication portion including a network interface card such as an LAN card or a modem and the like. The communication portion performs communication processing through a network such as the Internet. A driver is connected with the input/output interfaces as required. A removable medium, such as a magnetic disk, an optical disk, a magneto-optical disk, or a semiconductor memory is installed on the driver as required, so that a computer program read therefrom is installed into the memory as required.

Particularly, according to an embodiment of the present disclosure, the energy recovery method described in any of the above embodiments may be implemented as a computer software program. For example, an embodiment of the present disclosure includes a computer program product that includes a computer program tangibly included in a machine-readable medium. The computer program includes program code for performing the energy recovery method. In such an embodiment, the computer program may be downloaded and installed from a network through a communication portion and/or installed from a removable medium.

The units or modules described in the embodiments of the present disclosure may be implemented in software or hardware. The described units or modules may be disposed in a processor. Names of the units or modules do not constitute a limitation on the units or modules in a specific case.

The above description is merely certain embodiments of the present disclosure. A person skilled in the art should understand that the invention scope in the present disclosure is not limited to technical solutions formed by specific combinations of the above technical features, and covers other technical solutions formed by arbitrary combinations of the above technical features or equivalent features without departing from the present inventive concept. For example, the technical solutions formed by replacing the above features with (but not limited to) technical features with similar functions disclosed in the present disclosure.

What is claimed is:

1. An energy recovery method for a vehicle having a vehicle wheel coupled to a motor, comprising:

acquiring vehicle travelling information, wherein the vehicle travelling information comprises road condition information and travelling status information;

acquiring a vehicle braking demand according to the road condition information and the travelling status information;

predicting a first motor braking feedback, representing a first motor feedback torque fed back from the vehicle wheel to the motor and a first motor feedback time of the first motor feedback during braking, according to the vehicle braking demand, without regard to external factors including whether the motor can withstand the first motor feedback torque;

acquiring a second motor braking feedback, an actual feedback torque allowed to be outputted by the vehicle wheel to the motor for energy recovery and battery charging, according to the first motor braking feedback; and performing energy recovery according to the second motor braking feedback.

2. The method according to claim 1, wherein the acquiring a vehicle braking demand according to the road condition information and the travelling status information comprises:

acquiring a vehicle braking distance according to the road condition information and the travelling status information;

calculating a vehicle braking deceleration and a time corresponding to the deceleration according to the vehicle braking distance; and calculating the vehicle braking demand according to the vehicle braking deceleration and the time corresponding to the deceleration.

3. The method according to claim 1, wherein the predicting a first motor braking feedback according to the vehicle braking demand comprises:

calculating a wheel end feedback torque during vehicle braking according to the vehicle braking demand;

acquiring the first motor feedback torque of the first motor braking feedback according to the wheel end feedback torque during vehicle braking; and acquiring the first motor feedback time of the first motor braking feedback according to the first motor feedback torque, wherein the first motor feedback time is determined by the first motor feedback torque according to a battery pulse charging characteristic.

4. The method according to claim 3, wherein the acquiring the second motor braking feedback further comprises:

acquiring an optimal pulse charging power according to the battery pulse charging characteristic and the first motor braking feedback; and acquiring the second motor braking feedback according to the optimal pulse charging power, the vehicle braking demand, and a motor-acceptable torque limit.

5. The method according to claim 4, wherein the acquiring the second motor braking feedback according to the optimal pulse charging power, the vehicle braking demand, and a motor-acceptable torque limit comprises:

determining a motor-allowed wheel end feedback torque according to the optimal pulse charging power, wherein the motor-allowed wheel end feedback torque is a torque allowed to be fed back from a vehicle wheel end to a motor in an optimal pulse charging power condition;

determining a wheel end demand torque for vehicle braking according to the vehicle braking demand, wherein the wheel end demand torque is a torque required for completing braking of the wheel end during braking of the vehicle;

determining a motor-acceptable maximum wheel end feedback torque according to the motor-acceptable torque limit, wherein the motor-acceptable maximum wheel end feedback torque is a motor-acceptable maximum torque fed back by the wheel end to the motor; and selecting the smallest one of absolute values of the motor-allowed wheel end feedback torque, the wheel end demand torque for vehicle braking, and the motor-acceptable maximum wheel end feedback torque as a second motor feedback torque.

6. The method according to claim 5, further comprising:

providing a braking torque parameter to a braking controller according to the vehicle braking demand, to control the second motor feedback torque for vehicle braking; and enabling mechanical braking if the braking torque parameter of the second motor feedback torque does not satisfy the vehicle braking demand.

7. An energy recovery method for a vehicle having a vehicle wheel coupled to a motor, comprising:

acquiring vehicle travelling information, wherein the vehicle travelling information comprises road condition information and travelling status information;

acquiring a vehicle braking demand according to the road condition information and the travelling status information;

predicting a first motor braking feedback, representing a first motor feedback torque fed back from the vehicle wheel to the motor and a first motor feedback time of the first motor feedback during braking, according to the vehicle braking demand;

acquiring a second motor braking feedback, an actual feedback torque allowed to be outputted by the vehicle wheel to the motor for energy recovery and battery charging, according to the first motor braking feedback; and performing energy recovery according to the second motor braking feedback, wherein the predicting a first motor braking feedback according to the vehicle braking demand comprises:

calculating a wheel end feedback torque during vehicle braking according to the vehicle braking demand;

acquiring the first motor feedback torque of the first motor braking feedback according to the wheel end feedback torque during vehicle braking; and acquiring the first motor feedback time of the first motor braking feedback according to the first motor feedback torque, wherein the first motor feedback time is determined by the first motor feedback torque according to a battery pulse charging characteristic, wherein the acquiring the second motor braking feedback further comprises:

acquiring an optimal pulse charging power according to the battery pulse charging characteristic and the first motor braking feedback; and acquiring the second motor braking feedback according to the optimal pulse charging power, the vehicle braking demand, and a motor-acceptable torque limit, and wherein the acquiring an optimal pulse charging power according to the battery pulse charging characteristic and the first motor braking feedback comprises:

acquiring the first motor feedback time and the first motor feedback torque of the first motor braking feedback;

acquiring a maximum battery pulse charging power according to the first motor feedback time and the first motor feedback torque;

acquiring a charging duration of the maximum battery pulse charging power according to a battery pulse charging characteristic corresponding to the maximum battery pulse charging power; and determining the optimal pulse charging power according to the charging duration of the maximum battery pulse charging power, the battery pulse charging characteristic, and the first motor feedback time.

8. A non-transitory computer-readable storage medium containing computer-executable instructions for, when executed by one or more processors, performing an energy recovery method for a vehicle having a vehicle wheel coupled to a motor, the method comprising:

acquiring vehicle travelling information, wherein the vehicle travelling information comprises road condition information and travelling status information;

acquiring a vehicle braking demand according to the road condition information and the travelling status information;

predicting a first motor braking feedback, representing a first motor feedback torque fed back from the vehicle wheel to the motor and a first motor feedback time of the first motor feedback during braking, according to the vehicle braking demand, without regard to external factors including whether the motor can withstand the first motor feedback torque;

acquiring a second motor braking feedback, an actual feedback torque allowed to be outputted by the vehicle wheel to the motor for energy recovery and battery charging, according to the first motor braking feedback; and performing energy recovery according to the second motor braking feedback.

9. The non-transitory computer-readable storage medium according to claim 8, wherein the acquiring a vehicle braking demand according to the road condition information and the travelling status information comprises:

acquiring a vehicle braking distance according to the road condition information and the travelling status information;

calculating a vehicle braking deceleration and a time corresponding to the deceleration according to the vehicle braking distance; and calculating the vehicle braking demand according to the vehicle braking deceleration and the time corresponding to the deceleration.

10. The non-transitory computer-readable storage medium according to claim 8, wherein the predicting a first motor braking feedback according to the vehicle braking demand comprises:

calculating a wheel end feedback torque during vehicle braking according to the vehicle braking demand;

acquiring the first motor feedback torque of the first motor braking feedback according to the wheel end feedback torque during vehicle braking; and acquiring the first motor feedback time of the first motor braking feedback according to the first motor feedback torque, wherein the first motor feedback time is determined by the first motor feedback torque according to a battery pulse charging characteristic.

11. The non-transitory computer-readable storage medium according to claim 10, wherein the acquiring the second motor braking feedback further comprises:

acquiring an optimal pulse charging power according to the battery pulse charging characteristic and the first motor braking feedback; and acquiring the second motor braking feedback according to the optimal pulse charging power, the vehicle braking demand, and a motor-acceptable torque limit.

12. The non-transitory computer-readable storage medium according to claim 11, wherein the acquiring an optimal pulse charging power according to the battery pulse charging characteristic and the first motor braking feedback comprises:

acquiring the first motor feedback time and the first motor feedback torque of the first motor braking feedback;

acquiring a maximum battery pulse charging power according to the first motor feedback time and the first motor feedback torque;

acquiring a charging duration of the maximum battery pulse charging power according to a battery pulse charging characteristic corresponding to the maximum battery pulse charging power; and determining the optimal pulse charging power according to the charging duration of the maximum battery pulse charging power, the battery pulse charging characteristic, and the first motor feedback time.

13. The non-transitory computer-readable storage medium according to claim 11, wherein the acquiring the second motor braking feedback according to the optimal pulse charging power, the vehicle braking demand, and a motor-acceptable torque limit comprises:

determining a motor-allowed wheel end feedback torque according to the optimal pulse charging power, wherein the motor-allowed wheel end feedback torque is a torque allowed to be fed back from a vehicle wheel end to a motor in an optimal pulse charging power condition;

determining a wheel end demand torque for vehicle braking according to the vehicle braking demand, wherein the wheel end demand torque is a torque required for completing braking of the wheel end during braking of the vehicle;

determining a motor-acceptable maximum wheel end feedback torque according to the motor-acceptable torque limit, wherein the motor-acceptable maximum wheel end feedback torque is a motor-acceptable maximum torque fed back by the wheel end to the motor; and selecting the smallest one of absolute values of the motor-allowed wheel end feedback torque, the wheel end demand torque for vehicle braking, and the motor-acceptable maximum wheel end feedback torque as a second motor feedback torque.

14. The non-transitory computer-readable storage medium according to claim 13, the method further comprising:

providing a braking torque parameter to a braking controller according to the vehicle braking demand, to control the second motor feedback torque for vehicle braking; and enabling mechanical braking if the braking torque parameter of the second motor feedback torque does not satisfy the vehicle braking demand.

* * * * *